United States Patent [19]

Degawa et al.

[11] Patent Number: 4,710,481

[45] Date of Patent: Dec. 1, 1987

[54] METHOD FOR MELTING TI OR A HIGH-TI ALLOY IN CAO REFRACTORIES

[75] Inventors: Toru Degawa, Kurashiki; Gen Okuyama, Tamano; Akio Hashimoto, Takamatsu; Seiju Uchida; Kouzou Fujiwara, both of Tamano; Makoto Ebata, Tokyo; Takashi Satou, Sendai; Tohei Ototani, Tokyo, all of Japan

[73] Assignee: Mitsui Engineering & Shipbuilding Co., Ltd., Tokyo, Japan

[21] Appl. No.: 906,487

[22] Filed: Sep. 11, 1986

[30] Foreign Application Priority Data

Sep. 13, 1985 [JP] Japan ................................. 60-202813

[51] Int. Cl.$^4$ ............................................... C04B 2/02
[52] U.S. Cl. .............................. 501/123; 29/DIG. 45; 75/65 R
[58] Field of Search .................... 501/94, 123; 423/76, 423/440, 442, 492, 441; 75/65 R

[56] References Cited

FOREIGN PATENT DOCUMENTS 1058856  3/1986  Japan ................................. 501/123

Primary Examiner—William R. Dixon, Jr.
Assistant Examiner—James M. Hunter, Jr.
Attorney, Agent, or Firm—Frank J. Jordan; C. Bruce Hamburg; Manabu Kanesaka

[57] ABSTRACT

Ti or a high-Ti alloy is melted in a container composed of high-purity CaO materials on its inner sides. The materials are composed of not less than 99% by weight of CaO, not more than 0.1% by weight of $SiO_2$, not more than 0.02% by weight of $Fe_2O_3$, and not more than 0.5% by weight in total of other metal oxides under a non-oxidizing atmosphere.

CaO refractories for use in the melting of Ti or a high-Ti alloy contains not less than 99% by weight of CaO, not more than 0.1% by weight of $SiO_2$, 0.02% by weight of $Fe_2O_3$, and not more than 0.5% by weight of other metal oxides.

20 Claims, 5 Drawing Figures

METHOD FOR MELTING TI OR A HIGH-TI ALLOY IN CAO REFRACTORIES

FIELD OF THE INVENTION AND RELATED ART STATEMENT

This invention relates to a method for melting Ti or a high-Ti alloy in CaO refractories, and more particularly relates to a method for melting Ti or a high-Ti alloy in a high-purity CaO container and high-purity CaO refractories suitable therefor.

Ti is a metal endowed with various characteristics such as possessing high tensile strength even in a state free from addition of any special alloy element as compared with other metallic materials, possessing as high strength as steel and aluminum alloy, exhibiting stability in various chemical environments, and showing superior corrosion resistance particularly against oxidizing acids. In recent years, therefore, pure Ti and Ti alloys having properties improved by combination therein of alloy elements have been taken up as subjects of the study conducted in search of methods of utility in various applications such as, for example, metallic materials for aircraft and space industry and materials for chemical industry.

Since Ti and Ti alloys have high melting points and high degrees of activity, they have been melted by the consumable electrode arc melting method or the plasma melting method. These methods, however, have the disadvantage that they consume considerably larger electric power and, for the purpose of producing homogeneous ingots, take more melting time. In the case of a melting method which uses a high-frequency induction melting furnace or a low-frequency induction melting furnace, the contamination caused by refractories exposed to the molten metal constitutes a problem in particular.

Generally, the high-frequency induction melting furnace uses refractories of magnesia or graphite basis. As the refractories are exposed to molten Ti, there ensues the increment of oxygen and carbon contents in the melt as indicated below.

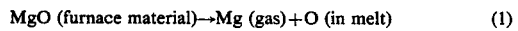

MgO (furnace material)→Mg (gas)+O (in melt)    (1)

C (furnace material)→C (in melt)    (2)

Thus, Ti or a Ti alloy, when melted with an ordinary refractory container, fails to obtain a desirable alloy without an additional process. Recently, therefore, it has been proposed to use a CaO container for the melting of a Ti alloy because of its thermal stability and basicity (Japanese Patent Publication SHO No. 59(1984)-40,210 and Japanese Patent Application Laid-open SHO No. 59(1984)-67,332).

Besides, the methods heretofore proposed for the melting of Ti alloys are invariably intended for production of Ti alloys of low Ti contents (Japanese Patent Application Laid-open SHO No. 59-(1984)-67,332 covers an invention relating to a Ti-Ni alloy having a Ti:Ni (mol) ratio of 1:1 and Japanese Patent Publication SHO No. 59(1984)-40,210 covers an invention relating to a Ti type alloy having a Ti content in the range of about 36 to 47% by weight). These specifications make no mention whatever about a high-Ti alloy having a Ti content or about a method for melting pure Ti.

Since Ti possesses extremely high activity as described above, the melting of pure Ti or a high-Ti alloy with the conventional CaO container entails such damage to the furnace wall of CaO as to render continuous use of the container impracticable, while a low-Ti allow having a Ti content of not more than 64.5% by weight can be melted with the conventional CaO container.

It has long been admitted by many researchers that pure Ti or a high-Ti alloy cannot be melted with the conventional CaO container. For example, the July, 1983 issue of "Kinzoku (Metals)," contains in the entry "(3) Titanium alloy", pages 30–33, particularly page 33, a report to the effect that a Ti alloy having a Ti content of not more than about 50% by weight can be barely melted with the CaO container.

SUMMARY OF THE INVENTION

An object of the invention is to provide a method for melting pure Ti or a high-Ti alloy at an extremely high purity heretofore unattainable by the conventional melting technique with CaO refractories.

Another object of the ivention is to provide a method for easily melting Ti or a Ti alloy of a low oxygen content and a low carbon content exhibiting extremely high superiority with CaO refractories.

Yet another object of the ivention is to provide a method for easily melting Ti or a Ti alloy having an extremely homogeneous composition and warranting ease of casting and CaO refractories to be used for the method.

To accomplish the objects described above, the present invention provides:

A method for melting Ti, characterized by melting Ti in a container of a high-purity CaO material of which an inner side thereof is composed of not less than 99% by weight of CaO, not more than 0.1% by weight of $SiO_2$, not more than 0.02% by weight of $Fe_2O_3$, and not more than 0.5% by weight of other metal oxides under a non-oxidizing atmosphere.

A method for melting a high-Ti alloy, characterized by melting high-Ti alloy in a container of a high-purity CaO material of which an inner side thereof is composed of not less than 99% by weight of CaO, not more than 0.1% by weight of $SiO_2$, not more than 0.02% by weight of $Fe_2O_3$, and not more than 0.5% by weight of other metal oxides under a non-oxidizing atmosphere, and CaO refractories for melting Ti or a high-Ti alloy, characterized by being composed of not less than 99% by weight of CaO, not more than 0.1% by weight of $SiO_2$, not more than 0.02% by weight of $Fe_2O_3$, and not more than 0.5% by weight of other metal oxides.

BRIEF DESCRIPTION OF THE DRAWINGS

FIG. 1 shows the relation between the $SiO_2$ content in a crucible material obtained in Example 1 and the oxygen content of the melt, and FIG. 2 shows the relation between the $Fe_2O_3$ content in a crucible material obtained in Example 2 and the oxygen content of the melt.

DESCRIPTION OF THE PREFERRED EMBODIMENTS

Figure 1:
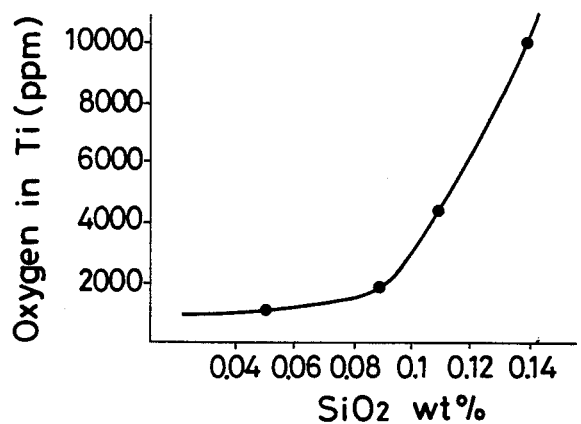
FIG. 1 and FIG. 2 are graphs showing the results of the determinations indicated in working examples.

The inventors continued a diligent study to elucidate the cause for the damage incurred on the furnace wall of CaO by Ti during the melting of Ti or a high-Ti alloy with the ordinary CaO container in spite of higher stability of CaO than that of TiO$_2$, and consequently acquired a finding that the damage to the furnace wall is caused by a low CaO purity. They have continued a study based on this finding and have perfected the present invention.

Now, the invention will be described in detail below.

Wherever "% (percent)" is mentioned in the specification, it is meant as "% by weight".

The term "high-Ti alloy" as used in the present invention refers to a Ti alloy containing one or more elements selected from among Al, Cr, Fe, Mn, Ni, Cu, V, Sn, Zr, Mo, Nb, Si, Bi, etc. and having a Ti content of not less than 65%, particularly not less than 70%, and preferably not less than 85%.

The term "Ti" refers to an industrially pure Ti having purity of not less than 97%. Concrete examples of "Ti" satisfying the requirement are denoted in Table 1 below. JIS means Japanese Industrial Standards.

TABLE 1

| Designation | JIS title | Grade | Ti purity (%) |
| --- | --- | --- | --- |
| Sponge Ti | JIS H-2151 | Grade 1 | Not less than 99.6 |
|  |  | Grade 2 | Not less than 99.4 |
|  |  | Grade 3 | Not less than 99.3 |
|  |  | Grade 4 | Not less than 99.2 |
| Molded Ti | JIS H-2152 | Grade 1 | Not less than 99.0 |
|  |  | Grade 2 | Not less than 97.0 |
| Ti plates and strips | JIS H-4600 | Grade 1 | Not less than 99.6 |
|  |  | Grade 2 | Not less than 99.5 |
|  |  | Grade 3 | Not less than 99.3 |
| Ti tubes for piping | JIS H-4630 | Grade 1 | Not less than 99.6 |
|  |  | Grade 2 | Not less than 99.5 |
|  |  | Grade 3 | Not less than 99.3 |

In the present invention, the Ti or high-Ti alloy of the foregoing description is melted by the conventional method such as, for example, the high-frequency or low-frequency induction heating method using a container formed of high-purity CaO materials, which contact directly with molten metal, an inner wall thereof being composed of not less than 99% of CaO, not more than 0.1% of SiO$_2$, not more than 0.02% of Fe$_2$O$_3$, and not more than 0.5% of other metal oxides (such as, for example, Al$_2$O$_3$, MgO, ZrO$_2$, and TiO$_2$) under a non-oxidizing atmosphere such as a vacuum or an inert atmosphere (such as, for example, argon or helium).

As high-purity CaO refractories, suitable for the construction of the inner side of the container to be used in melting Ti or a high-Ti alloy in accordance with the present invention, those formed of fused calcia are especially good because of high density. The calcia (CaO) which is obtained by sintering calcium carbonate such as limestone, calcium hydroxide such as slaked lime, or other calcium composed is also used. The CaO refractories obtained by sintering are desired to be so pure that the SiO$_2$ content will be not more than 0.05% and the Fe$_2$O$_3$ content not more than 0.01%.

The refractories of the present invention may be irregularly shaped refractories such as stamped materials or regularly shaped refractories. The irregularly shaped refractories can be used in accordance with any of the well known methods. The container for the melting can be produced, for example, by applying the irregularly shaped refractories on the inner wall surface of the container.

For the production of such irregularly shaped refractories as stamped materials, nonaqueous additives (such as, for example, pitch, tar, or ethanol having calcium chloride or beeswax dissolved therein) are used as a binder. The regularly shaped refractories can be formed by press molding the calcia in the presence or absence of the aforementioned nonaqueous binder and optionally sintering the molded masses. The regularly shaped refractories are not required to have any specifically defined shape but may bound integrally in the shape of a container such as a crucible. Otherwise, they may be molded in cubes, rectangular pipes, or other shapes enclosed in curved faces.

The method for melting according to the present invention comprises holding the molten alloy in a container having at least the inner side thereof formed of the refractories described above and optionally having a deoxidizer contained therein. This container may be something like a crucible formed solely of the aforementioned melting refractories or a fireproof container having melting refractories (either regularly shaped or irregularly shaped refractories) applied on the inner wall surface.

The retention of the molten alloy in this container can be attained by pouring a melt melted in advance in a separate melting device into the container or by placing all or part of the raw materials for the alloy in the container and melting them into a melt by application of heat.

In the present ivention, the molten alloy is retained in the container under a non-oxidizing atmosphere. The non-oxidizing atmosphere is desired to be formed of such an inert gas as argon.

The high-purity CaO refractories contemplated by the present invention have extremely high stability to withstand the action of Ti enough to permit the melting of Ti or a high-Ti alloy. Further, since the high-purity CaO refractories are not only stable thermodynamically but also capable of absorbing various oxides in the molten Ti or high-Ti alloy and notably lowering the oxide contents of the melt, they permit the manufacture of Ti or Ti alloy of high purity.

By using the container having the inner side thereof formed of high-purity CaO materials, therefore, the melting of Ti or a high-Ti alloy which has been heretofore considered as impracticable can be rendered practicable.

The invention is highly advantageous economically because the method thereof brings about various effects such as:

(1) Easy production of Ti or a Ti alloy having a low oxygen content and a low carbon content.
(2) Acquisition of unusually high properties by the produced alloy.
(3) Extremely homogeneous composition of the produced alloy.
(4) Ease of the casting of the produced Ti or Ti alloy.

The method of this invention for the melting of Ti or high-Ti alloy described above can be easily worked by the melting container which is formed of the high-purity CaO refractories of the invention.

Now, the present invention will be described more in detail below with reference to working examples. The invention is not limited to the working examples but may be practiced otherwise than indicated therein without departing from the spirit of the present invention.

EXAMPLE 1

Crucibles were produced by using CaO refractories of four different compositions, No. 1 through 4, indicated in Table 2. These crucibles were produced by mixing CaO powder and particles as raw materials, press molding the resulting mixtures, sintering the molded mixtures at 950° C. for one hour, and then sintering them further at 1700° C. for three hours.

Sponge titanium, grade 1 (Ti purity of not less than 99.6%) under JIS H-2151, was charged in an amount of about 200 g each in the four CaO crucibles. The crucibles were placed in an internally heating induction furnace having an output of 10 KW and a frequency of 70 KHz and heated therein for melting of the sponge titanium under 1 atmosphere of argon for 20 minutes to determine visually whether or not the melting of the sponge titanium could be obtained satisfactorily.

The results were as shown in Table 2. It is noted from the results that in the conventional CaO crucibles, the melting could not be performed effectively because the inner walls thereof were damaged by the molten Ti. In contrast, in the crucibles conforming to the present invention, the melting could be performed satisfactorily without any damage to the inner walls thereof.

In Table 2, the oxygen contents (ppm) in the pure Ti products obtained by the melting are also shown. It is noted from Table 2 that in the comparative experiments, the pure Ti products had originally high oxygen contents exceeding 5,000 ppm, whereas in the working examples, the oxygen contents in the pure Ti products were invariably lower than 1,000 ppm.

In the CaO raw materials, No. 1 through No. 4, the contents of other metal oxides not denoted in Table 2 were invariably less than 0.006%.

TABLE 2

| No. | 1 | 2 | 3 | 4 |
| --- | --- | --- | --- | --- |
| Sort of CaO | Sintered product of reagent CaO | Fused calcia | Sintered product of high-purity CaO | High-purity fused calcia |
| Crucible composition (%) | | | | |
| CaO | 98.5 | 99.1 | 99.9 min. | 99.6 min. |
| Fe$_2$O$_3$ | 0.03 | 0.02 | 0.005 | 0.01 |
| SiO$_2$ | 0.06 | 0.11 | 0.005 | 0.07 |
| MgO | 0.34 | 0.41 | 0.010 | 0.1 |
| Al$_2$O$_3$ | 0.01 | 0.02 | 0.006 | 0.01 |
| Success in melting | X | Δ | ○ | ⊚ |
| Oxygen content in melted in pure Ti (ppm) | — | 5400 | 830 | 750 |
| Remark | Comparative experiments | | Working examples | |

*X: Unsuccessful melting due to damage to the crucible.
Δ: Inferior melting (permeation of the melt to a depth exceeding 10 mm in the crucible wall).
○: Satisfactory melting, with permeation of the melt into the crucible wall limited to about 3 mm.
⊚: Extremely satisfactory melting, with permeation of the melt into the crucible wall limited to about 1 mm.

EXAMPLE 2

In producing crucibles by molding and sintering the sintered product of high-purity CaO indicated in No. 3 of Example 1, varying amounts of ethyl silicate as the raw material for SiO$_2$ were added to the CaO raw material to produce four crucibles containing Fe$_2$O$_3$, MgO, and Al$_2$O$_3$ in the same composition as indicated in No. 3 of Table 2 and containing SiO$_2$ in different composition of 0.05%, 0.09%, 0.11%, and 0.14%. The conditions for the molding and sintering used in the production of these crucibles were identical to those of Example 1.

In these crucibles, sponge titanium was melted by using the same induction furnace under the same conditions as in Example 1. The pure Ti products obtained by the melting were tested for oxygen content.

The results are shown in FIG. 1. It is noted from FIG. 1 that the oxygen content in the melt sharply increased when the SiO$_2$ content exceeded 0.1%.

EXAMPLE 3

In producing crucibles by molding and sintering the sintered product of high-purity CaO indicated in No. 3 of Example 1, varying amounts of iron oxide as the raw material for Fe$_2$O$_3$ were added to the CaO raw material to produce four crucibles containing CaO, SiO$_2$, MgO, and Al$_2$O$_3$ in the same composition as indicated in No. 3 of Table 2 and containing Fe$_2$O$_3$ in different composition of 0.01%, 0.015%, 0.02%, and 0.025%. The conditions for the molding and sintering used in the production of these crucibles were identical to those of Example 1.

In these crucibles, sponge titanium was melted by using the same induction furnace under the same conditions as in Example 1. The pure Ti products obtained by the melting were tested for oxygen content.

Figure 2:
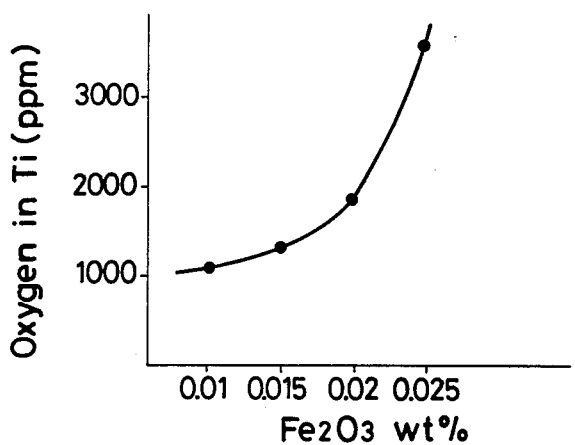

The results are shown in FIG. 2. It is noted from FIG. 2 that the oxygen content in the melt sharply increased when the Fe$_2$O$_3$ content exceeded 0.02%.

EXAMPLE 4

A crucible was produced by using the fused calcia (CaO 99.1%) indicated in No. 2 of Table 2. A crucible was produced by using the sintered product of high-purity CaO (CaO not less than 99.9%) indicated in No. 3 of Table 2. These crucibles were produced by the procedure of Example 1.

In the crucibles, a Ti-6%Al-4%V (by weight) alloy was melted. As the raw materials for this alloy, sponge titanium of purity exceeding 99.9% and an Al-V alloy having an aluminum purity of 99% were used.

In the crucibles, the raw materials for the alloy were charged and heated by the use of the same induction furnace as in Example 1 under 1 atmosphere of argon, with the melting continued until 10 minutes after the melt down. Thereafter, the melts were cast each in a mold of steel. The cast alloys were tested for oxygen content. As the result, it was found that the alloy melted in the crucible made of the fused calcia (99.1% of CaO) contained 3,450 ppm of oxygen, whereas the alloy melted in the crucible made of calcia (99.9% of CaO) contained 1,020 ppm of oxygen.

EXAMPLE 5

The alloy was melted by following the procedure of Example 4, except that the alloy had a composition of Ti-20%Ni (% by weight). This alloy was produced by using sponge titanium as the raw material for Ti and Ni of purity exceeding 99.9% as the raw material for Ni. Consequently, the alloy produced by using a crucible formed of fused calcia having a CaO purity of 99.1% contained 1,350 ppm of oxygen and the alloy produced by using a crucible formed of calcia having a CaO purity exceeding 99.9% contained 520 ppm of oxygen.

EXAMPLE 6

The alloy was melted by following the procedure of Example 4, except that the alloy had a composition of Ti-33%Al (% by weight). This alloy was produced by using sponge titanium as the raw material for Ti and Al of purity exceeding 99.9% as the raw material for Ni. As the result, it was found that the alloy produced by using a crucible formed of fused calcia having a CaO purity of 99.1% contained 620 ppm of oxygen and the alloy produced by using a crucible formed of calcia having a CaO purity exceeding 99.9% contained 360 ppm of oxygen.

EXAMPLE 7

In producing crucibles by molding and sintering the sintered product of high-purity CaO indicated in No. 3 of Example 1, varying amounts of aluminum oxide as the raw material for $Al_2O_3$ were added to the CaO raw material to produce four crucibles containing $Fe_2O_3$, MgO, and $SiO_2$ in the same composition as indicated in No. 3 of Table 2 and containing $Al_2O_3$ in different composition of 0.05%, 0.15%, 0.5%, and 1.2%. The conditions for the molding and sintering used in the production of these crucibles were identical to those of Example 1.

In these crucibles, sponge titanium was melted by using the same induction furnace under the same conditions as in Example 1. The pure Ti products obtained by the melting were tested for oxygen content.

Figure 3:
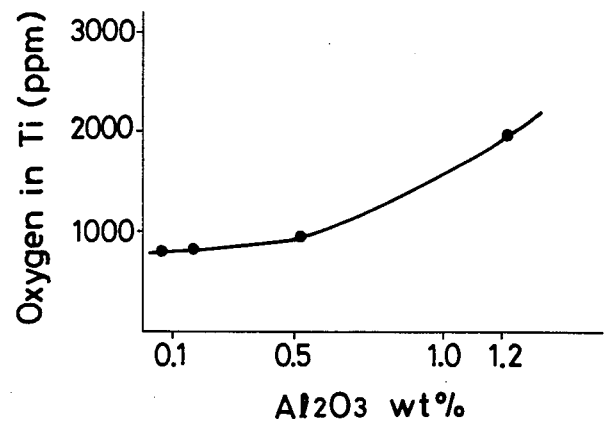
FIG. 3, FIG. 4, and FIG. 5 show the relations between other metal oxides contained in the crucibles and oxygen contents in the melt.

The results are shown in FIG. 3. It is noted from FIG. 3 that the oxygen content in the melt sharply increased when the $Al_2O_3$ content exceeded 0.5%.

EXAMPLE 8

In producing crucibles by molding and sintering the sintered product of high-purity CaO indicated in No. 3 of Example 1, varying amounts of magnesium oxide as the raw material for MgO were added to the CaO raw material to produce four CaO crucibles containing $Fe_2O_3$, $SiO_2$, and $Al_2O$ in the same composition as indicated in No. 3 of Table 2 and containing MgO in different composition of 0.20%, 0.52%, 0.95%, and 1.12%. The conditions for the molding and sintering used in the production of these crucibles were identical to those of Example 1.

In these crucibles, sponge titanium was melted by using the same induction furnace under the same conditions as in Example 1. The pure Ti products obtained by the melting were tested for oxygen content.

Figure 4:
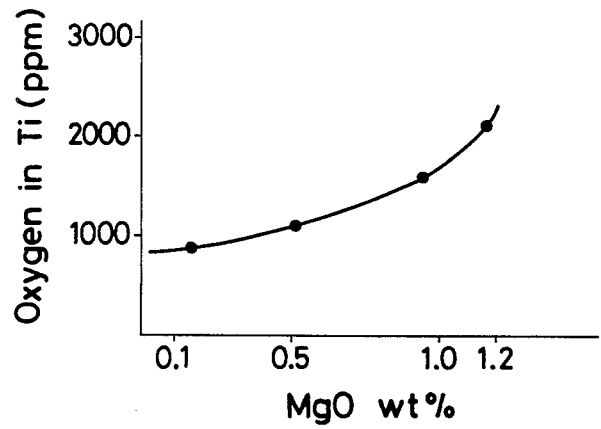

The results are shown in FIG. 4. It is noted from FIG. 4 that the oxygen content in the melt increased when the MgO content exceeded 0.5%.

EXAMPLE 9

In producing crucibles by molding and sintering the sintered product of high-purity CaO indicated in No. 3 of Example 1, varying amounts of zirconium oxide as the raw material for $ZrO_2$ were added to the CaO raw material to produce three CaO crucibles containing $SiO_2$, $Fe_2O_3$, MgO, and $Al_2O_3$ in the same composition as indicated in No. 3 of Table 2 and containing $ZrO_2$ in different composition of 0.01%, 0.51%, and 1.30%. The conditions for the molding and sintering used in the production of these crucibles were identical to those of Example 1.

In these crucibles, sponge titanium was melted by using the same induction furnace under the same conditions as in Example 1. The pure Ti products obtained by the melting were tested for oxygen content.

Figure 5:
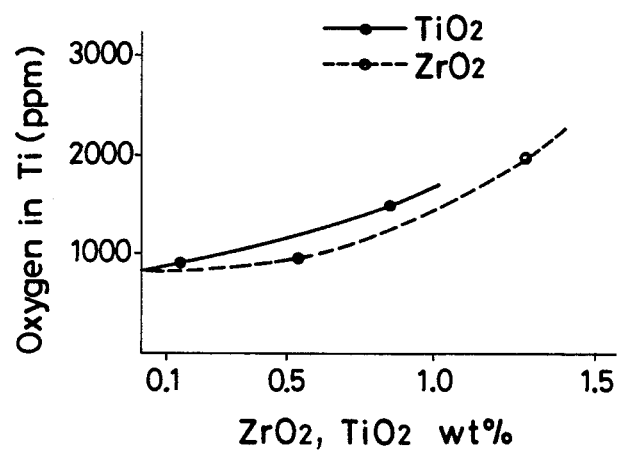

The results are shown in FIG. 5. It is noted from FIG. 5 that the oxygen content in the melt increased when the $ZrO_2$ content exceeded 0.5%.

EXAMPLE 10

In producing crucibles by molding and sintering the sintered product of high-purity CaO indicated in No. 3 of Example 1, varying amounts of titanium oxide as the raw material were added to the CaO raw material to produce three CaO crucibles containing $SiO_2$, $Fe_2O_3$, MgO, and $Al_2O_3$ in the same composition as indicated in No. 3 of Table 2 and containing $TiO_2$ in different composition of 0.006%, 0.15% and 0.85%. The conditions for the molding and sintering used in the production of these crucibles were identical to those of Example 1.

In these crucibles, sponge titanium was melted by using the same induction furnace under the same conditions as in Example 1. The pure Ti products obtained by the melting were tested for oxygen content.

The results are shown in FIG. 5. It is noted from FIG. 5 that the oxygen content in the melt increased when the $TiO_2$ content exceeded 0.5%.

What is claimed is:

1. A method for melting Ti, comprising melting Ti in a container formed of high-purity CaO materials having the inner sides thereof composed of not less than 99% by weight of CaO, not more than 0.1% by weight of $SiO_2$, not more than 0.02% by weight of $Fe_2O_3$, and not more than 0.5% by weight in total of other metal oxides under a nonoxidizing atmosphere.

2. A method according to claim 1, wherein said other metal oxides include at least one member selected from the group consisting of $Al_2O_3$, MgO, $ZrO_2$, and $TiO_2$ 3. A method according to claim 1, wherein said CaO materials have fused calcia as a main component thereof.

4. A method according to claim 1, wherein said CaO materials have sintered calcia as a main component thereof.

5. A method according to claim 4, wherein said sintered calcia has a $SiO_2$ content of not more than 0.05% by weight and a $Fe_2O_3$ content of not more than 0.01% by weight.

6. A method according to claim 1, wherein Ti is an industrial grade pure Ti having purity of not less than 97% by weight.

7. A method for melting a high-Ti alloy, comprising melting high-Ti in a container formed of high-purity CaO materials having inner sides thereof composed of not less than 99% by weight of CaO, not more than 0.1% by weight of $SiO_2$, not more than 0.02% by weight of $Fe_2O_3$, and not more than 0.5% by weight in total of other metal oxides under a nonoxidizing atmosphere.

8. A method according to claim 7, wherein said other metal oxides include at least one member selected from the group consisting of $Al_2O_3$, MgO, $ZrO_2$, and $TiO_2$.

9. A method according to claim 7, wherein said CaO materials have fused calcia as a main component thereof.

10. A method according to claim 7, wherein said CaO materials have sintered calcia as a main component thereof.

11. A method according to claim 10, wherein said sintered calcia has a $SiO_2$ content of not more than 0.05% by weight and a $Fe_2O_3$ content of not more than 0.01% by weight.

12. A method according to claim 7, wherein said high-Ti alloy is a Ti alloy containing at least one member selected from the group consisting of Al, Cr, Fe, Mn, Ni, Cu, V, Sn, Zr, Mo, Nb, Si, and Bi.

13. A method according to claim 7, wherein said high-Ti alloy is an alloy having a Ti content of not less than 65% by weight.

14. A method according to claim 7, wherein said high-Ti alloy is an alloy having a Ti content of not less than 70% by weight.

15. A method according to claim 7, wherein said high-Ti alloy is an alloy having a Ti content of not less than 85% by weight.

16. CaO refractories for use in the melting of Ti or a high-Ti alloy, comprising not less than 99% by weight, of CaO not more than 0.1% by weight of $SiO_2$, not more than 0.02% by weight of $Fe_2O_3$, and not more than 0.5% by weight in total of other metal oxides.

17. CaO refractories according to claim 16, wherein said other metal oxides include at least one member selected from the group consisting of $Al_2O_3$, MgO, $ZrO_2$, and $TiO_2$.

18. CaO refractories according to claim 16, wherein said CaO refractories have fused calcia as a main component thereof.

19. CaO refractories according to claim 16, wherein said CaO refractories have sintered calcia as a main component thereof.

20. CaO refractories according to claim 9, wherein said sintered calcia has a $SiO_2$ content of not more than 0.05% by weight and a $Fe_2O_3$ content of not more than 0.01% by weight.

* * * * *